US009594686B2

(12) United States Patent
Woodward et al.

(10) Patent No.: US 9,594,686 B2
(45) Date of Patent: Mar. 14, 2017

(54) FILE HANDLING WITHIN A CLOUD-BASED FILE SYSTEM

(71) Applicant: Google Inc., Mountain View, CA (US)

(72) Inventors: Joshua Woodward, Mountain View, CA (US); Kazuhiro Inaba, Tokyo (JP); Kenneth Brian Moore, Seattle, WA (US); Achuith Bhandarkar, Mountain View, CA (US); Kokkuan Tan, Pleasanton, CA (US)

(73) Assignee: Google Inc., Mountain View, CA (US)

( * ) Notice: Subject to any disclaimer, the term of this patent is extended or adjusted under 35 U.S.C. 154(b) by 287 days.

(21) Appl. No.: 13/841,368

(22) Filed: Mar. 15, 2013

(65) Prior Publication Data

US 2013/0297887 A1    Nov. 7, 2013

Related U.S. Application Data

(60) Provisional application No. 61/643,279, filed on May 5, 2012, provisional application No. 61/736,722, filed on Dec. 13, 2012.

(51) Int. Cl.
  *G06F 12/08*  (2016.01)
  *G06F 12/12*  (2016.01)
  *G06F 17/30*  (2006.01)

(52) U.S. Cl.
  CPC ........ *G06F 12/0862* (2013.01); *G06F 12/126* (2013.01); *G06F 17/30132* (2013.01);
  (Continued)

(58) Field of Classification Search
  None
  See application file for complete search history.

(56) References Cited

U.S. PATENT DOCUMENTS

| | | | |
|---|---|---|---|
| 6,345,318 B1 * | 2/2002 | Gamon | ............................. 710/8 |
| 6,687,793 B1 * | 2/2004 | Thomas | .............. G06F 12/0866 |
| | | | 711/100 |

(Continued)

FOREIGN PATENT DOCUMENTS

| | | |
|---|---|---|
| CN | 101997929 A | 3/2011 |
| CN | 102292698 A | 12/2011 |

(Continued)

OTHER PUBLICATIONS

Search Report and Written Opinion for International Application No. PCT/US2013/039411, mailed Jul. 30, 2013, 12 pages.

(Continued)

*Primary Examiner* — Midys Rojas
*Assistant Examiner* — Jane Wei
(74) *Attorney, Agent, or Firm* — Brake Hughes Bellermann LLP

(57) ABSTRACT

In one general aspect, a computer-readable storage medium can be configured to store instructions that when executed cause one or more processors to perform a process. The process can include establishing at least a portion of a communication link between a computing device and a storage system operating within a cloud environment. The process can include accessing a user interface including a listing of files representing a plurality of files where at least a first portion of the plurality of files are stored in a local memory of the computing device and a second portion of the plurality of files are stored in the storage system.

21 Claims, 8 Drawing Sheets

(52) U.S. Cl.
CPC .... *G06F 17/30203* (2013.01); *G06F 12/0866* (2013.01); *G06F 2212/463* (2013.01)

(56) References Cited

U.S. PATENT DOCUMENTS

| | | | | |
|---|---|---|---|---|
| 7,802,065 | B1* | 9/2010 | Eatough | G06F 12/0813 711/130 |
| 8,788,628 | B1* | 7/2014 | Taylor et al. | 709/219 |
| 8,918,488 | B2 | 12/2014 | Umbehocker | |
| 2003/0055828 | A1* | 3/2003 | Koch | G06F 17/241 |
| 2006/0206896 | A1* | 9/2006 | Fontijn | 718/104 |
| 2006/0230076 | A1 | 10/2006 | Gounares et al. | |
| 2007/0220417 | A1* | 9/2007 | Mathew | G06F 17/3089 715/234 |
| 2007/0283081 | A1* | 12/2007 | Lasser | G06F 12/0246 711/103 |
| 2008/0005121 | A1 | 1/2008 | Lam et al. | |
| 2010/0199042 | A1 | 8/2010 | Bates et al. | |
| 2011/0113205 | A1 | 5/2011 | Puga et al. | |
| 2011/0307573 | A1 | 12/2011 | Lingafelt et al. | |
| 2012/0185767 | A1* | 7/2012 | Schlegel | 715/255 |
| 2012/0254340 | A1* | 10/2012 | Velummylum | G06F 17/30126 709/213 |
| 2013/0054514 | A1* | 2/2013 | Barrett-Kahn | G06F 17/30902 707/608 |
| 2013/0132463 | A1* | 5/2013 | Garcia-Ascanio et al. | 709/203 |
| 2013/0138608 | A1* | 5/2013 | Smith | G06F 17/30575 707/610 |
| 2013/0238553 | A1 | 9/2013 | Kim et al. | |

FOREIGN PATENT DOCUMENTS

| | | |
|---|---|---|
| CN | 103180842 A | 6/2013 |
| JP | 2006-520032 A | 8/2006 |
| WO | 2011023134 A1 | 3/2011 |
| WO | 2013169583 A1 | 11/2013 |

OTHER PUBLICATIONS

International Preliminary Report on Patentability for PCT Patent Application No. PCT/US2013/039411, mailed on Nov. 20, 2014, 9 pages.

Office Action from corresponding Application No. CN201380023770.1 with English Translation, mailed Aug. 2, 2016, 18 pages.

* cited by examiner

FILE HANDLING WITHIN A CLOUD-BASED FILE SYSTEM

CROSS-REFERENCE TO RELATED APPLICATIONS

This application is a non-provisional of, and claims priority to, U.S. Patent Application No. 61/643,279, filed May 5, 2012, entitled "FILE HANDLING WITHIN A CLOUD-BASED FILE SYSTEM" and is a non-provisional of, and claims priority to, U.S. Patent Application No. 61/736,722, filed Dec. 13, 2012, entitled "FILE HANDLING WITHIN A CLOUD-BASED FILE SYSTEM", both of which are each incorporated by reference herein in their entireties.

TECHNICAL FIELD

This description relates to file handling within a cloud-based file system.

BACKGROUND

A variety of remote storage systems have been developed for storing files that can be accessed by a computing device. Often, these known remote storage systems store files to back up local files stored on the computing device. Although these remote storage systems can be accessed via a network, can store information reliably, and so forth, many of these known remote storage systems lack flexibility and integration especially when handling a variety of files that can be generated using different sources. Thus, a need exists for systems, methods, and apparatus to address the shortfalls of present technology and to provide other new and innovative features.

SUMMARY

In one general aspect, a non-transitory computer-readable storage medium can be configured to store instructions that when executed cause one or more processors to perform a process. The process can include establishing at least a portion of a communication link between a computing device and a storage system operating within a cloud environment, and can include storing a listing of files representing a plurality of files where at least a first portion of the plurality of files are stored in a local memory of the computing device and a second portion of the plurality of files are stored in the storage system. The process can include designating a file from the listing of files for availability offline based on a file category associated with the file from the listing of files.

In another general aspect, a non-transitory computer-readable storage medium can be configured to store instructions that when executed cause one or more processors to perform a process. The process can include establishing at least a portion of a communication link between a computing device and a storage system operating within a cloud environment. The process can also include receiving a request to open a first file stored on the storage system and, in response to the request to open the first file, caching the first file in a local memory of the computing device, the first file being cached with a first priority. The process can further include receiving a request that a second file stored on the storage system be available offline and, in response to the request that the second file be available offline, caching the second file in the local memory of the computing device, the second file being cached with a second priority that is lower than the first priority. The process can still further include predictively caching, in the local memory of the computing device, a third file stored in the storage system, the third file being selected based on one or more attributes of the third file, the third file being cached with a third priority that is lower than the second priority.

In yet another general aspect, a non-transitory computer-readable storage medium can be configured to store instructions that when executed cause one or more processors to perform a process. The process can include establishing at least a portion of a communication link between a computing device and a storage system operating within a cloud environment, the computing device including a local memory that is configured to cache files from the storage system. The process can also include receiving an indication that a file caching threshold of the local memory of the computing device has been met or exceeded. The process can further include, in response to the indication, evicting, until an eviction threshold is met, at least a portion of a set of cached files from the local memory of the computing device, the at least a portion of the set of cached files being evicted from a lowest caching priority to a highest caching priority and based on respective timestamps of each file of the set of cached files.

The details of one or more implementations are set forth in the accompanying drawings and the description below. Other features will be apparent from the description and drawings, and from the claims.

DETAILED DESCRIPTION

Figure 1:
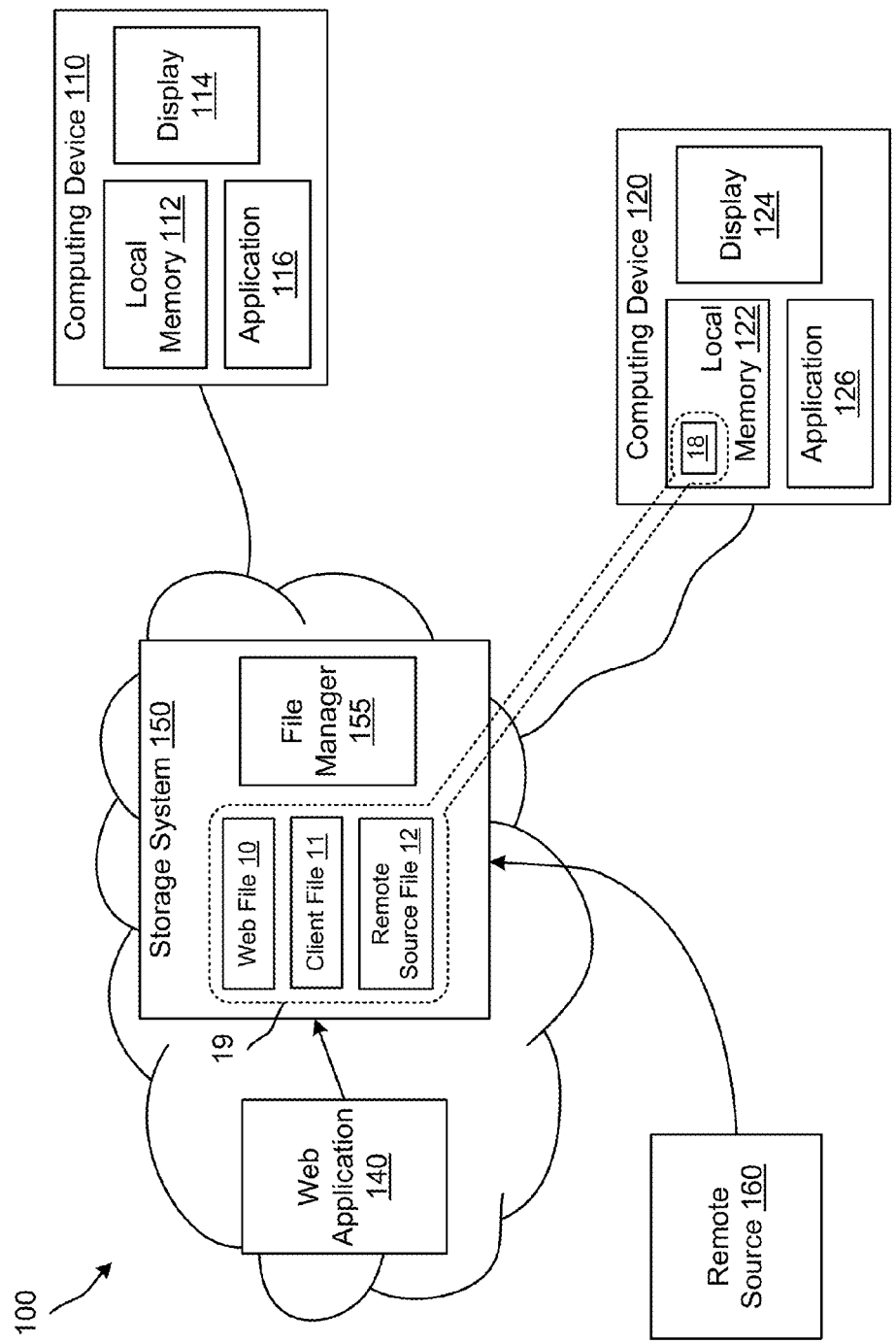
FIG. 1 is a diagram that illustrates computing devices configured to access files from a cloud-based storage system operating within a cloud environment.

FIG. 1 is a diagram that illustrates computing devices 110, 120 configured to access files 19 from a storage system 150 operating within a cloud environment 100. Because the storage system 150 is operating in the cloud environment 100, the storage system 150 can, in some implementations, be referred to as a cloud-based storage system. Also, the storage system 150 can be a remote (e.g., non-local) storage system that is remotely access by the computing devices 110, 120. The cloud environment 100 can include a variety of hardware and/or software components including servers (e.g., application servers), databases, and so forth. The components of the cloud environment 100 can be integrated into a computing infrastructure configured to share (e.g., dynamically allocate) resources and/or service a variety of endpoints including the computing devices 110, 120.

The computing devices 110, 120 can be any type of device configured to access the storage system 150 operating within the cloud environment 100. In some implementations, the computing devices 110, 120 can each be, for example, a wired device and/or a wireless device (e.g., Wi-Fi enabled device) and can be, for example, a computing entity (e.g., a personal computing device), a server device (e.g., a web server), a mobile phone, a touchscreen device, a personal digital assistant (PDA), a laptop, a television including, or associated with, one or more processors, a tablet device, e-reader, and/or so forth. The computing device(s) can be configured to operate based on one or more platforms (e.g., one or more similar or different platforms) that can include one or more types of hardware, software, firmware, operating systems, runtime libraries, and/or so forth.

In some implementations, the computing devices 110, 120 can have relatively few computing resources (e.g., processing resources, storage resources) compared with the cloud environment 100. Accordingly, the computing devices 110, 120 and the cloud environment 100 can be collectively configured so that the computing devices 110, 120 can leverage the computing resources of the cloud environment 100. Specifically, the storage system 150 of the cloud environment 100 and the computing devices 110, 120 can be configured so that the storage system 150 operates as a primary storage system for the computing devices 110, 120. As shown in FIG. 1, the computing device 110 and the computing device 120 respectively include a local memory 112 and a local memory 122. Even though the computing devices 110, 120 include local memories 112, 122, the local memories 112, 122 are configured to operate as a cache of (e.g., a temporary cache, a temporary storage location to) the storage system 150. Accordingly, the local memories 112, 122 can function as a secondary storage to the primary storage of the storage system 150. In some embodiments, for example, a portion of a storage capacity of the storage system 150 allocated to (e.g., designated for use by) the computing device 110 can be more than 10 times greater (e.g., 100 times greater, 1000 times greater) than a storage capacity of the local memory 112 of the computing device 110.

Even though the local memories 112, 122 of the respective computing devices 110, 120 function as a cache (or secondary storage) to the storage system 150, the files that are stored in one or more of the local memories 112, 122 and in the storage system 150 can be handled as a unitary or singular set of files. In other words, one or more of the local memories 112, 122, and the storage system 150 can function as a unitary storage system (e.g., a single virtual storage system, a single virtual hard drive). For example, files stored in one or more of the local memories 112, 122 and stored in the storage system 150 can be presented to a user (e.g., presented to a user via a user interface) accessing the files in such a way that the storage locations may not be readily distinguished. Accordingly, whether a user accesses files via the computing device 110 or the computing device 120, a file listing associated with files stored in one or more of the local memories 112, 122, and the storage system 150 will be the same (or substantially the same). More details related to file handling are described below.

As shown in FIG. 1, the storage system 150 is configured to store files 19 that can be designated into one or more categories including hosted files, client files, remote source files, and so forth. In this implementation, most of the files 19 are labeled based on the category with which each of the files 19 is associated. Accordingly, the files 19 include a web file 10 (also can be referred to as a hosted file), a client file 11, and a remote source file 12. The web file 10 can be included in a web file category, the client file 11 can be included in a client file category, and the remote source file 12 can be included in a remote source file category. In some implementations, each of the files 19 can be various types of files such as, for example, a text-based file (e.g., a document file), a spreadsheet file, an image file (e.g., a joint photographic experts group (JPEG) file), a video file (e.g., a moving picture experts group (MPEG) file), a music file (e.g., an MPEG audio layer III (MP3) file), and so forth.

The web file 10 can be a file created using a web application 140 such as that shown in FIG. 1. The web application 140 can be any type of application that can be, for example, hosted within the cloud environment 100. In some implementations, the web application 140 can be a hosted application. In some implementations, web application 140 can be remotely controlled as it operates within the cloud environment 100 by one or more of the computing devices 110, 120. More details related to web applications and host applications are described later in this Detailed Description.

The client file 11 can be a file that is stored in the storage system 150 from one or more of the computing devices 110, 120. For example, the client file 11 can be a file that is stored in the storage system 150 from one or more of the computing devices 110, 120. For example, the client file 11 can be a file produced using an application 126 operating at the computing device 120. The application 126 can be a local application installed at and operating at the computing device 120. In some implementations, the application 126 may not be operational within a cloud environment.

The remote source file 12 can be a file that is stored in the storage system 150 from a remote source 160. In some implementations, the remote source 160 can be a source that operates outside of the cloud environment 100 (e.g., independent from the cloud environment 100 and from the computing devices 110, 120). In some implementations, the remote source 160 can be a computing device separate (or independent) from the computing devices 110, 120. In some implementations, a remote source 160 can be a third-party source that operates independent of the cloud environment 100. In some implementations, the remote source 160 can be moved into the storage system 150 in response to one or more instructions triggered by one or more of the computing devices 110, 120.

As shown in FIG. 1, at least a portion of the files 19 can be at least temporarily be stored (e.g., cached) in the local memory 122 of the computing device 120. Specifically, file 18 included in the files 19 is stored in local memory 122 of the computing device 120. The file 18 can be a shadowed, mirrored, or synchronized copy of any of the files stored in the storage system 150. For example, the file 18 can be a shadowed or mirrored copy of the web file 10 stored in the storage system 150. The file 18, in some implementations, can be a file that is stored in local memory 122 without being mirrored at the storage system 150. For example, the file 18 can be another client file, separate from client file 11, created at and stored in the local memory 122. In some implementations, the file 18 can be a file that is stored (e.g., stored temporarily) in the local memory 122 so that the file 18 can be readily accessed (e.g., manipulated) at computing device 120. Although not shown in FIG. 1, at least a portion of the files 19 can be at least temporarily stored in the local memory 112 of the computing device 110.

The storage system 150 includes a file manager 155. In some implementations, the file manager 155 can function as a web application. The file manager 155 is configured to provide a user interface through which the computing devices 110, 120 can access the files 19 stored in the storage system 150 and/or at one or more of the computing devices 110, 120. In some implementations, the user interface provided by the file manager 155 can include a file system user interface. In some implementations, the user interface provided by the file manager 155 can represent a listing of the files 19 (e.g., hierarchy, folder system, enumeration, record, inventory) and/or other metadata about the files 19 (e.g., owner, creation date, filename, file availability/state). The listing of the files 19 can include references to (e.g., pointers to, indicators of) one or more of the files 19. Accessing the files 19 can include viewing, deleting, editing, downloading, uploading, and/or so forth.

Figure 3:
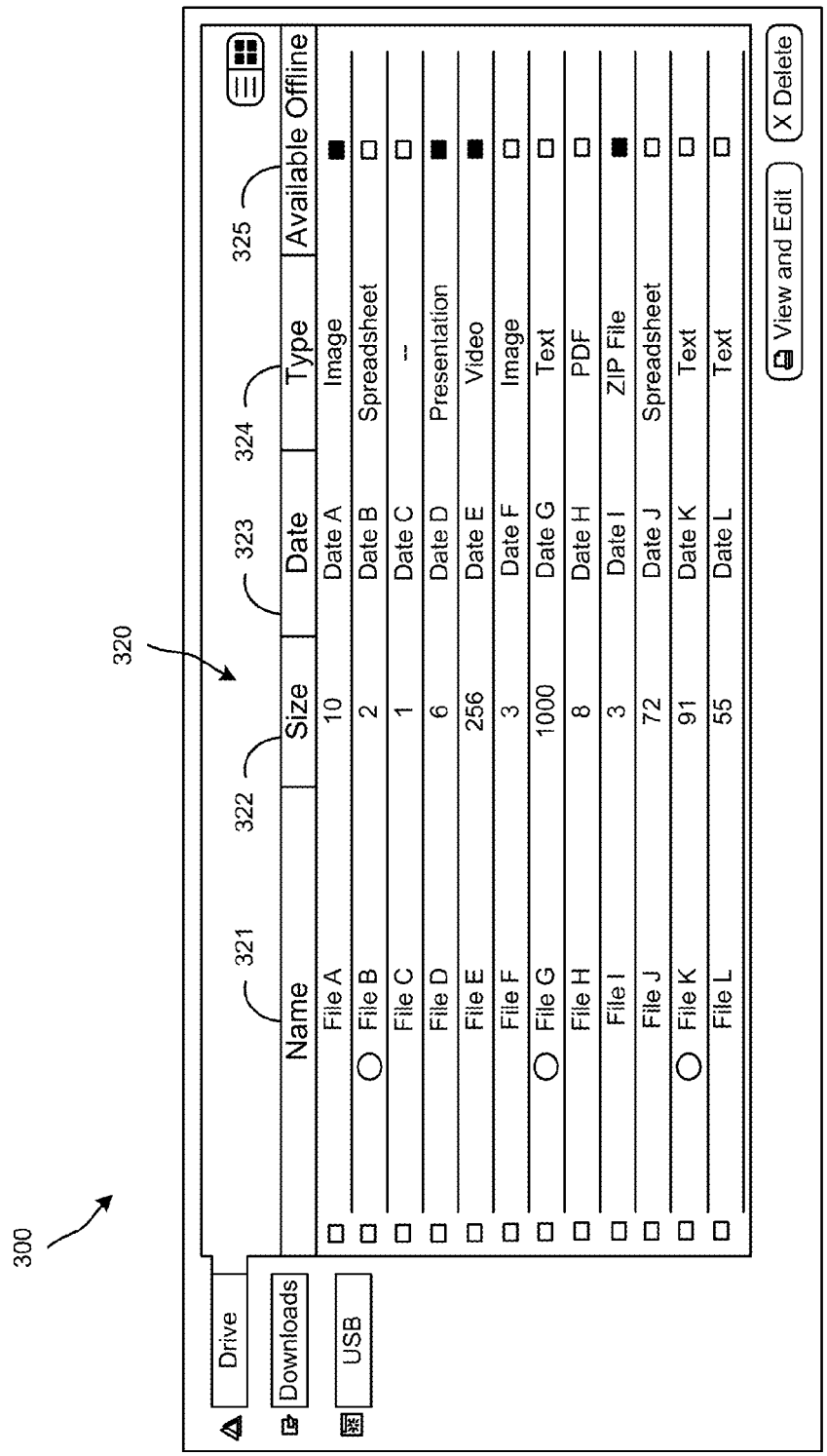
FIG. 3 is a diagram that illustrates the user interface that can be provided by a file manager to a computing device.

For example, the web file 10 can be produced and stored in the storage system 150 using web application 140 in response to input from the computing device 120. The web file 10 (or an identifier thereof) can later be viewed in a user interface provided by the file manager 155 at a display 114 of the computing device 110. The web file 10 can be selected and edited using the computing device 110 via the web application 140. An example of the user interface through which one or more of the files 19 can be accessed is illustrated in FIG. 3 and discussed in more detail in connection with FIG. 3.

The files 19 can be associated with a user account so that a listing of the files 19 provided within a user interface by the file manager 155 to the computing device 110 or the computing device 120 will be the same whether a user logs in to the computing device 110 or the computing device 120. In other words, the listing of the files 19 can be synchronized regardless of the computing device through which the listing of the files 19 is accessed. The listing of the files 19 provided within the user interface by the file manager 155 can be the same (e.g., synchronized, dynamically synchronized) even though a variety of categories of files can be included in the files 19 such as files categorized as a web application files, client files provided from a computing device, or files associated with a remote source. The listing of the files 19 provided within the user interface by the file manager 155 can be the same even though the files 19 can be distributed between the storage system 150 and/or the computing devices 110, 120. In some implementations, the listing of the files 19 can be the enumeration of which files are included in the files 19.

For example, in some implementations, a user can log in to the computing device 110 and can access and/or manipulate one or more of the files 19. After the user logs out of the computing device 110, the user can later log in to the computing device 120 to access and manipulate one or more files 19. When the user logs in to the computing device 120, the listing of the files 19 after the first login (using the computing device 110) can be presented to the user via the computing device 120. Accordingly, the listing of the files 19 can be seamlessly maintained (or synchronized) regardless of the computing device through which the user accesses files 19. Thus, the file manager 155 can be configured to provide the same (or synchronized) listing of the files 19 whether the user logs into the computing device 110 or the computing device 120. In some implementations, even though the listing of the files 19 can be maintained between the computing devices 110, 120, in some implementations the states of one or more of the files 19 can change. In some embodiments, the states can be related to the offline (e.g., non-network) or online availability of a file. More details related to states of files are discussed in connection with FIG. 3.

In some implementations, the file 18 can be a file that is downloaded to (e.g., fetched for) the computing device 120 for use at the computing device 120 by a user (if not already available in the local memory 122 of the computing device 120). In some implementations, a current version of a file (e.g., file 18) may already be available in the local memory 122 of the computing device 120, and would not be downloaded from the storage system 150. In some implementations, before a file is downloaded from the storage system 150, the local memory 122 may be audited to determine whether or not the file is already cached in the local memory 122.

In some implementations, the file 18 can be downloaded into the local memory 122 on-demand by a user (e.g., in response to an instruction triggered by the user) of the computing device 120. In some implementations, the file 18, is stored in the local memory 122 can be available for offline access at the computing device 120. The computing device 120 may not have access to any network or a network where the storage system 150 can be accessed when offline. For example, a user of the computing device 120 can request access to the remote source file 12 stored in the storage system 150. In response to the requests, a copy of the remote storage file 12 can be downloaded to the local memory 122 of the computing device 120 as file 18. The file 18 can be used (e.g., edited, manipulated, access) by the user at the computing device 120. In some implementations, any changes to the file 18 can be mirrored in (e.g., synchronized within) the remote source file 12 stored in the storage system 150.

Figure 4:
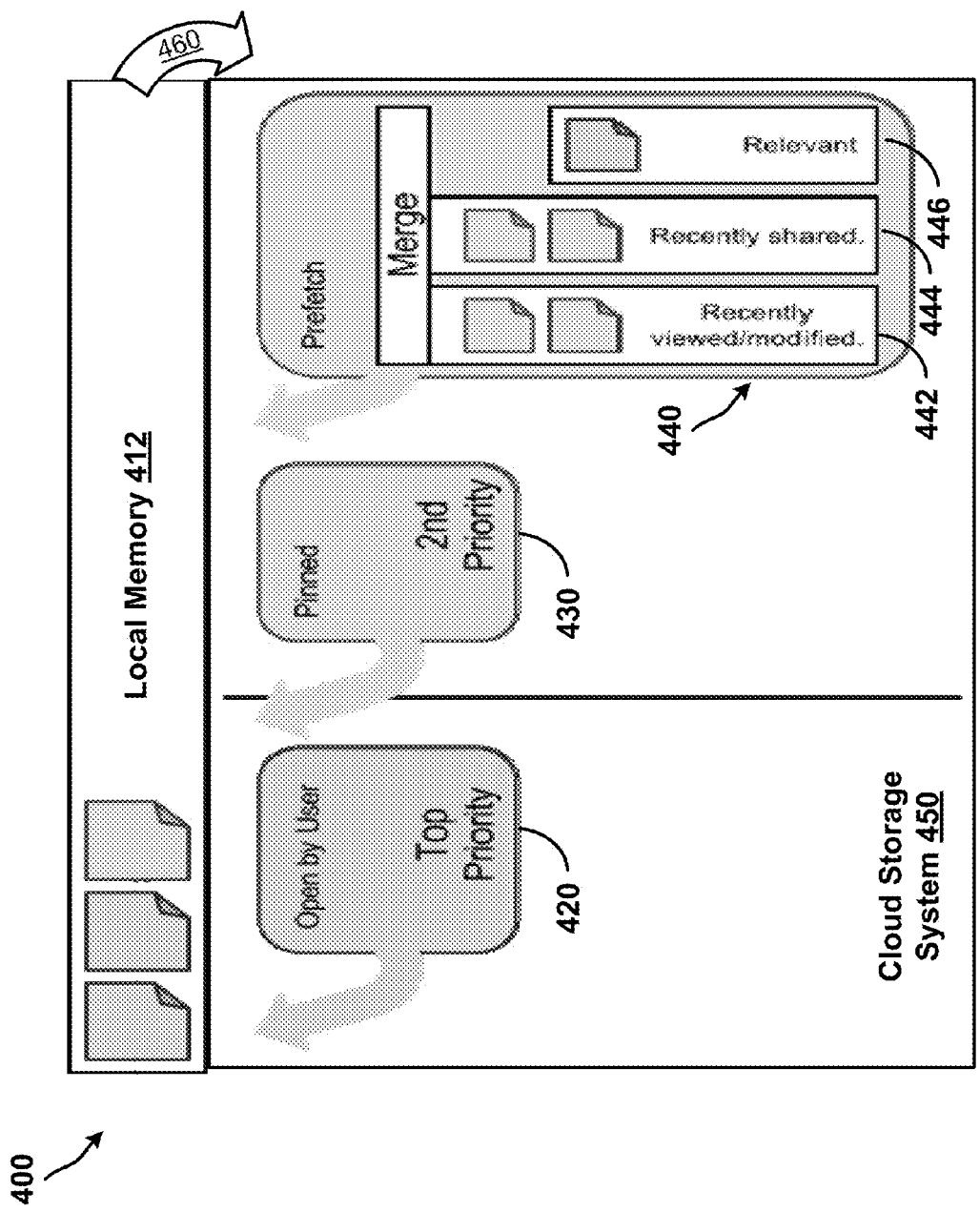
FIG. 4 is a diagram that illustrates a file system in which example approaches for fetching (caching) files from a cloud-based storage system for storage in a local memory and for evicting (removing) files from the local memory (cache).

In some implementations, the file 18 can be fetched (e.g., pre-fetched) and downloaded to the computing device 120 for use without being explicitly requested by a user of the computing device 120. In other words, one or more files can be automatically cached at the computing device 120 for use by a user. For example, when a user logs in to the computing device 120, the file 18 can be automatically downloaded to the local memory 122 of the computing device 120. In some implementations, the file can be automatically downloaded based on one or more criteria. The criteria can be related to a prediction as to whether or not the file 18 may be accessed by the user of the computing device 120. In some implementations, the criteria can include a criteria related to recent accessing of the file 18, relationship of the file to other recently accessed files 18, file categories and/or file types typically accessed by the user, and/or so forth. An example approach for downloading (fetching) files for storage in a local memory (e.g., from a cloud-based storage system) is illustrated in FIG. 4 and described in further detail below with respect to FIG. 4.

In some implementations, the file 18 can be removed from (e.g., deleted from, temporarily removed from, flushed from) the local memory 122 of the computing device 120. In some implementations, the file 18 can be removed from the local memory 122 of the computing device 120 based on one or more criteria including, for example, datetime stamp of the file 18, size of the file 18, and/or so forth. In some implementations, the file 18 can be removed from the local memory 122 of the computing device 120 in response to resources of the local memory 122 of the computing device 120 (or other components of the computing device 120) being re-allocated for other operations of the computing device 120. In some implementations, the file 18 can be removed from the local memory 122 the computing device 120 in conjunction with other files that may be stored in the local memory 122. An example approach for evicting (removing) files from local memory (e.g., from a cloud-based storage system) is also illustrated in FIG. 4 and described in further detail below with respect to FIG. 4.

Although not shown in FIG. 1, in some implementations, one or more of the files 19 can be directly processed by an application of one or more of the computing devices 110, 120 without being cached at the computing devices 110, 120. In other words, caching of one or more of the files 19 can be bypassed when processing is performed using one or more of the computing devices 110, 120. For example, processing of the web file 10 and/or a portion thereof can be handled by the web application 140 operating within the cloud environment 100 and/or using the application 126 at the computing device 120. In such implementations, explicit caching of the web file 10 in the local memory 122 of the computing device 120 may be bypassed. In some implementations, only a portion of the web file 10 may be stored in a temporary memory location within the computing device 120 separate from the local memory 122.

In some implementations, the local memories 112, 122 can be any type of memory such as a random-access memory, a disk drive memory (e.g., a solid-state drive (SSD)), flash memory, and/or so forth. In some implementations, the local memories 112, 122 can be relatively long-term storage memory compared with other memory included in the computing devices 110, 120. In some implementations, the local memories 112, 122 can be the longest-term memory components included in the computing devices 110, 120. In some implementations, the local memories 112, 122 can be separate from cache memory associated with a processor and separate from RAM type memory. In some implementations, the local memories 112, 122 can be implemented as more than one memory component (e.g., more than one random-access memory (RAM) component or disk drive memory) associated with the components of the computing devices 110, 120.

In some implementations, the web application 140 can be configured to be executed or interpreted by a web browser (not shown). This can be contrasted with a native application that can include machine executable code and can be configured to be executed directly by a processor or via an operating system of a computing device, whereas, the web application 140 may, in some implementation, be incapable of execution or display without the aid of the web browser. Thus, the web application 140 can be operated inside (e.g., executed from within) a browser with a dedicated user interface, and typically provide functionality and an experience that is more rich and interactive than a standalone website but are less cumbersome and monolithic than a desktop application. A web browser can be executed by a computing device (e.g., the computing devices 110, 120) can receive code (e.g., HTML code, Javascript) from a remote server (e.g., a remote server that hosts a website) and can execute the received code on the computing device for the benefit of a user of the computing device. Examples of web applications can include games, photo editors, and video players that are executed within the browser.

In some implementations the web application 140 can be a hosted application or a packaged application. Hosted applications may include at least a portion of a web site that itself includes web pages, plus some metadata that may be especially pertinent to the web application or to the user of the web application to allow the web application to perform some particular functionality for the user. Such metadata may include, for example, a name of the application, a description of the application, a version of the application, and any URLs that the application uses, including the launch page for the application (i.e., the web page that a browser goes to when a user clicks the hosted application's icon). The metadata may be contained in a manifest file (e.g., a .crx file) hosted on a server of a developer or a server of a digital marketplace.

Packaged applications can be considered web applications whose code is bundled, so that the user can download at least a portion of the content of a web application for execution by the browser. A packaged web application may not be dependent on network access to perform its functionality for the user, and rather may be executed successfully by the browser locally on the computing device without access to a network. Packaged web applications have the option of using Extension APIs, allowing packaged applications to change the way the browser behaves or looks.

Figure 2:
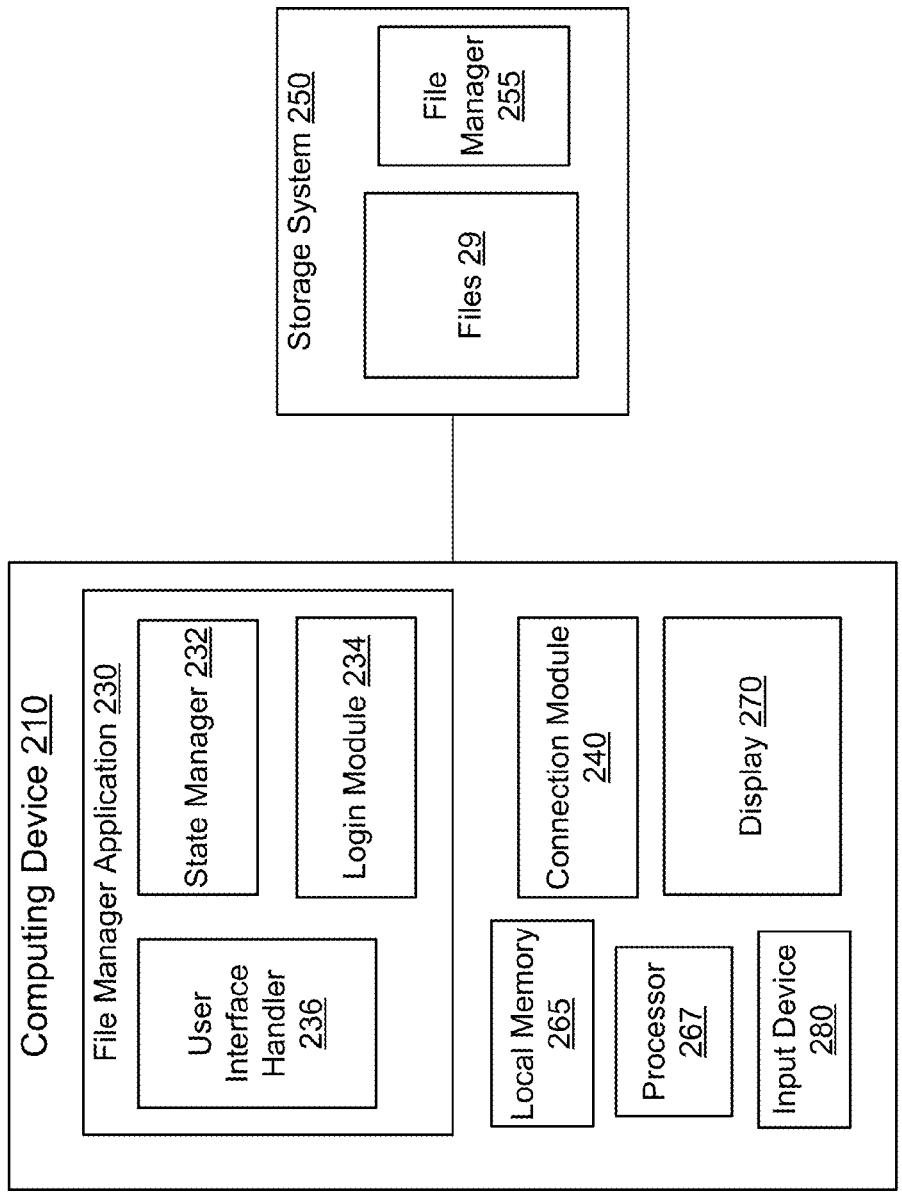
FIG. 2 is a diagram that illustrates a computing device and a storage system according to an implementation.

FIG. 2 is a diagram that illustrates a computing device 210 and a storage system 250 according to an implementation. The computing device 210 is configured to establish at least a portion of a communication link (e.g., a unidirectional communication link, a bidirectional communication link) with the storage system 250. Although not shown in FIG. 2, the storage system 250 can be configured to operate within a cloud environment. The storage system 250 includes files 29 and a file manager 255. Although not explicitly shown in FIG. 2, in this implementation, the files 29 can include files that are stored in a local memory 265 of the computing device 210. Accordingly, the file manager 255 can be associated with files that are locally stored at the computing device 210 or remotely stored in the storage system 250. The locally stored files can be synchronized with and managed by the file manager 255 included in the storage system 250.

As shown in FIG. 2, the computing device 210 includes a file manager application 230. The file manager application 230 can be configured to interact with (e.g., access, trigger operations of) the file manager 255 of the storage system 250. The file manager application 230 can, in some implementations, be a web application configured to operate within a browser (operate within a browser-based operating system). The computing device 210 includes a local memory 265 and a processor 267. The processor 267 can be associated with any of the components of the computing device 210, and can be used for execution of any of the operations of the computing device 210.

The file manager application 230 includes a user interface handler 236 configured to handle processing related to the user interface provided from the storage system 250 by the file manager 255. The file manager application 230 includes a state manager 232 that can be used by a user of the computing device 210 to change a state of one or more of the files 29 associated with the storage system 250 (via a user interface, which can be a browser-based operating system in some implementations). The file manager application 230 also includes a login module 234 configured to handle one or more user accounts associated with the files 29 (via a user interface).

The computing device 210 includes a client connection module 240 configured to establish at least a portion of a communication link between the computing device 210 and the storage system 250. In some implementations, the communication link between the computing device 210 and the storage system 250 can be a wireless connection, a wired connection, a peer-to-peer connection, a network connection, a secure connection, an encrypted connection, and/or so forth.

The computing device 210 also includes an input device 280 that can be configured to trigger one or more operations of the computing device 210. In some implementations, the input device 280 can be, or can include, for example, a mouse device, a keyboard device, a touchpad device, a microphone, and/or so forth. The computing device 210 includes a display 270 that can be any type display such as, for example, a light emitting diode (LED) display, an electrostatic touch device, a resistive touchscreen device, a surface acoustic wave (SAW) device, a capacitive touchscreen device, a pressure sensitive device, a surface capacitive device, a projected capacitive touch (PCT) device, and/or so forth. If the display 270 is a touch sensitive device, the display 270 can function as an input device. For example, the display 270 can be configured to display a virtual keyboard (e.g., emulate a keyboard) that can be used by a user as an input device.

The components (e.g., modules, processors) of the computing device 210 and/or the storage system 250 can be configured to operate based on one or more platforms (e.g., one or more similar or different platforms) that can include one or more types of hardware, software, firmware, operating systems, runtime libraries, and/or so forth. In some implementations, the components of the computing device 210 and/or the storage system 250 can be configured to operate within a cluster of devices (e.g., a server farm). In such an implementation, the functionality and processing of the components of the computing device 210 and/or the storage system 250 can be distributed to several devices of the cluster of devices.

The components of the computing device 210 and/or the components of the storage system 250 can be, or can include, any type of hardware and/or software configured to process attributes. In some implementations, one or more portions of the components shown in the components of the computing device 210 and/or the components of the storage system 250 in FIG. 3 can be, or can include, a hardware-based module (e.g., a digital signal processor (DSP), a field programmable gate array (FPGA), a memory), a firmware module, and/or a software-based module (e.g., a module of computer code, a set of computer-readable instructions that can be executed at a computer). For example, in some implementations, one or more portions of the components of the computing device 210 and/or the components of the storage system 250 can be, or can include, a software module configured for execution by at least one processor (not shown). In some implementations, the functionality of the components can be included in different modules and/or different components than those shown in FIG. 2.

In some implementations, one or more of the components of the computing device 210 and/or the components of the storage system 250 can be, or can include, processors configured to process instructions stored in a memory (in conjunction with or in addition to those shown). For example, the file manager application 230 (and/or a portion thereof) can be, or can include, a combination of a processor and a memory configured to execute instructions related to a process to implement one or more functions.

In some implementations, the storage system 250 can be a remote database, a local database, a distributed database, a relational database, a hierarchical database, and/or so forth. In some implementations, at least some portions of the storage system 250 can be stored in a memory (not shown) (e.g., a local memory) of the computing device 210. In some implementations, the storage system 250 can be, or can include, a memory shared by multiple devices such as computing device 210. In some implementations, the storage system 250 can be associated with a server device (not shown) within a network and configured to serve the components of the computing device 210.

Although not shown, in some implementations, the components of the computing device 210 and/or the components of the storage system 250 can be configured to operate within, for example, a data center (e.g., a cloud computing environment), a computer system, one or more server/host devices, and/or so forth. In some implementations, the components of the computing device 210 and/or the components of the storage system 250 can be configured to operate within a network. Thus, the components of the computing device 210 and/or the components of the storage system 250 can be configured to function within various types of network environments that can include one or more devices and/or one or more server devices. For example, the network can be, or can include, a local area network (LAN), a wide area network (WAN), and/or so forth. The network can be, or can include, a wireless network and/or wireless network implemented using, for example, gateway devices, bridges, switches, and/or so forth. The network can include one or more segments and/or can have portions based on various protocols such as Internet Protocol (IP) and/or a proprietary protocol. The network can include at least a portion of the Internet.

FIG. 3 is a diagram that illustrates a user interface 300 that can be provided by a file manager to a computing device. The user interface 300 can be provided by the file manager 155 shown in FIG. 1 and/or the file manager 255 shown in FIG. 2. The user interface 300 can be received by (e.g., controlled at) or more of the computing devices 110, 120 shown in FIG. 1, and/or the computing device 210 shown in FIG. 2.

As shown in FIG. 3, a listing of files 320 is represented within the user interface 300. The listing of files 320 includes files represented by the names (shown in column 321) File A through File L. The listing of files 320 includes a variety of information about each of the files including size (shown in column 322), date (shown in column 323), type (shown in column 324), and offline availability (shown in column 325). The files represented within the listing of files 320 can be designated into categories such as, for example, web files, the client files, remote source files, and/or so forth.

As shown in FIG. 3, even though the listing of files 320 can include files designated in a variety of categories, the files are represented within a single user interface 300 and in a single window labeled "Drive". In some implementations, other types of files, including files stored on an external storage device (such as a universal serial bus (USB) device), downloaded files, and/or so forth, can be listed in the Drive window.

In this implementation, several of the files represented within the listing of files 320 are shown as being designated as available offline. The files that are designated as being available offline are shown in column 325 with solid box icons that have been completely filled in (contrasted with open box icons which can be toggled to solid box icons). In some implementations, the offline availability of one or more of the files can be designated by a user via a computing device (e.g., the computing device 110 shown in FIG. 1). In such implementations, the files that are designated for offline availability can be stored in a local memory of the computing device. In some implementations, if the local memory of the computing device does not have sufficient space, additional files may not be designated for offline availability.

In this implementation, the files represented within the listing of files 320 can be in one of several states. In some implementations, one or more of the states can be designated based on a category of the file. In some implementations, one or more of the states can designated based on whether a file has been recently (or is currently) cached or un-cached in a local memory of a computing device. In some implementations, a state of the file can be designated by the user (via an instruction from a computing device of a user). In some implementations, a state of the file can be designated by default (without an explicit instruction from a computing device of a user). In some implementations, a state of the file can be designated based on metadata associated with the file. In other words, the state of a file can be based on any combination of a category designation, an instructions from a user, by default, how recently a file has been locally cached or whether the file is un-cached (not locally cached), and/or so forth. In some implementations, files represented within the listing of files 320 that are in a particular state can be represented within the user interface 300 with an icon, color scheme, font, and/or another designation so that the user can readily identify the state of the file.

For example, file A, since it is designated as (e.g., pinned as) a file for offline availability can be in an offline available state. In this implementation, the file A can readily be identified as available for offline processing by the solid box icon. As another example, file H, since it is not designated for offline availability can be in an online available state. Accordingly, file H may only be available for access by a computing device (e.g., the computing device 110) on a storage system (e.g., the storage system 150) when the computing device is in communication with the storage system. In this implementation, files associated with an open circle icon are web files. For example, file G is associated with an open circle and is a web file. The web files can be in an online available state even if not explicitly designated for offline availability by a user. In some implementations, the default state for the web files can be an online available state. In some implementations, web files can be accessed using an extension of a web application that is available offline. In some implementations, files that are cached in a local memory (but are not web files or designated for offline availability) can also be made available offline (until they are removed from the cache), such as discussed in further detail below with respect to FIG. 4.

In some implementations, files that are cached in a local memory can be recently accessed files that have been accessed within a threshold time period. Accordingly, at least some files that are explicitly pinned may be files that have been accessed outside of the threshold time period and are un-cached (not currently cached in a local memory of a computing device because the files have not recently been accessed). When explicitly pinned, the un-cached files can be moved to local storage and cached.

The user interface 300 shown in FIG. 3, or derivative thereof, can be used by one or more applications (e.g., Web applications, native applications) at a computing device (e.g., the computing device 110 shown in FIG. 1). For example, one or more of the files represented within the listing of files 320 shown in the user interface 300 can be selected and attached to a message via an e-mail application. In some implementations, a photo editing application or a word-processing application can be used to access one or more the files represented within the listing of files 320 shown in the user interface 300.

FIG. 4 is a diagram illustrating a file system 400 that implements example approaches for fetching (caching) files from a cloud-based storage system 450 (e.g., such as the storage system 150 shown in FIG. 1) for storage in a local memory 412 (e.g., such the local memory 112 shown in FIG. 1), as well as evicting cached files from the local memory 412. The approaches shown in FIG. 4 and described below are given by way of example. The order of fetching and/or evicting files may be different in various implementations. In the following discussion, example approaches for fetching (caching) files will be described and then corresponding approaches for evicting cached files (from local memory) will be described.

The approaches shown in FIG. 4 may be implemented using the techniques and/or apparatuses that were discussed above with respect to FIGS. 1-3. Still further, the approaches illustrated in FIG. 4 may be implemented in a dynamic fashion. For instance, files may be fetched (cached) and/or evicted (removed) dynamically (on an ongoing basis) based on a number of factors, such as a file being modified, a file being deleted, a file being opened, a file being closed, a file being designated as being available offline (pinned), a file being undesignated as being available offline (unpinned), and/or so forth. Accordingly, the specific files that are cached (stored) in the local memory 412 (e.g., are available offline) may continually change based on factors such as those just described. Also, caching and/or evicting files from a file cache included in the local memory 412 may be based on how much local memory is used for cached files and/or an amount of the local memory 412 that is needed to perform a requested operation (e.g., a request by a user). In some implementations, file caching may be performed, or not performed, based on a type of data network access that is available to a local computing device that includes the local memory 412. For instance, if only cellular data network access is available, file caching may be suspended until wired or WiFi network access is available, as an example.

As shown in FIG. 4, files may be cached (fetched, pre-fetched) according to a priority hierarchy. For instance, in the file system 400, files that are open by a user (open files) 420 may be cached in the local memory 412 with a highest priority. Accordingly, when a user is logged into a computing system that includes the local memory 412 and provides an indication that a specific file on the cloud storage system 450 is to be opened (e.g., an indication that a document file is to be opened in a word processor), that specific file would be fetched from the cloud storage system 450 and cached in the local memory 412. However, in some implementations, certain file types may not be cached in local memory 412, even when opened by a user. For instance, in the file system 400, Web files (such as the Web file 10) may not be cached in the local memory 412, because processing of such files may be handled by a Web application within a cloud environment and there may not be any significant advantage to locally caching such files.

As also shown in FIG. 4, pinned files 420 may be cached in the local memory 412 with a second highest priority (after open files). In an example implementation, after caching of the open files (user opened files) 420 is complete, the file system 400 may proceed to cache pinned files 430 (files that are designated by a user as being available offline, such as discussed with respect to FIG. 3). In some embodiments, if a threshold amount of the local memory 412 that is available for file caching is reached (or exceeded), such as while caching open files 420 or pinned files 430, the file system 400 (e.g., a computing device including the local memory 412) may perform an eviction process (such as described below) to free up storage space in the local memory 412 for file prefetching (caching) to continue. Alternatively, the file system 400 may discontinue (at least temporarily) file caching. In other embodiments, if a threshold amount of the local memory 412 available for file caching is reached (or exceeded), a notification may be provided to a user indicating that one or more files open should be (need to be) closed and/or one more files should be (need to be) unpinned (undesignated as being available offline) in order to allow file caching to continue.

In the example shown in FIG. 4, if an indication is received to designate a file as being pinned, and that file was previously cached in the local memory 412, the file may not be re-cached (re-fetched). Likewise, if an indication is received to open a file, and that file was previously cached in the local memory 412, the file may not be re-cached (re-fetched).

After caching of the open files 420 and the pinned files 430 is complete, the file system 400 may then prefetch (cache) additional files 440 from the cloud storage system 450 (for storage in the local memory 412) based on various attributes of files that are associated with a given (logged in) user. In the file system 400, the cloud storage system 450 may traverse a directory structure for a given user in order to construct a list of relevant file attributes. This traversal may be performed in response to the user accessing any of his or her files on the cloud storage system 450, or may be performed as part of a log in process for the user.

In an example implementation, after caching the open files 420 and the pinned files 430, the file system 400 may cache a predetermined number of files (e.g., 50 files, 100 files or 200 files) that have been recently accessed by a user (e.g., viewed by the user and/or modified by the user) and are associated with (owned by) the user, e.g., recently viewed/modified (accessed) files 442. The determination of which recently accessed files 442 are to be cached (fetched) may be based on one or more respective file attributes (e.g., collected during the file directory traversal discussed above) for each of the user's stored files that is included in the cloud storage system 450. For instance, the file attributes that are examined to determine which files to cache may include a "lastViewedByMeDate" attribute or a "modifiedByMeDate" attribute.

For example, if the predetermined number of recently accessed files 442 to be cached is 50 files, the memory system 400 may cache the 25 most recently modified files and the 25 most recently viewed (but not modified files). The 25 most recently modified files may be cached first, or may be cached in alternating fashion with the 25 most recently viewed files. In another implementation, the memory system 400 may cache the 50 most recently viewed files, which may or may not include recently modified files. In yet another embodiment, the memory system 400 may cache the 50 most recently modified files and not cache files that were only recently viewed (and not modified). As previously discussed, if a threshold amount of the local memory 412 that is available for file caching is reached (or exceeded), the file system 400 may perform an eviction process (such as described below) to free up storage space in the local memory 412 to allow file prefetching (caching) to continue or, alternatively, the file system 400 may stop caching files in the local memory 412. The threshold amount of storage may be calculated as a percentage of total storage space in the local memory 412, or may be specified as a fixed amount of storage space in the local memory 412. Also, the file system 400 may stop caching files if a total number of cached files reaches a threshold value indicating an upper limit of cached files allowed (e.g., 500, 1,000, 5,000, etc.).

After caching the recently accessed files 442, such as was described above, the file system 400 may then cache a predetermined number of files that have been recently shared with the given (logged in) user, such as by using respective "sharedWithMeDate" file attributes of files associated with (owned by) the given (logged in) user, e.g., recently shared files 444. For example, if the predetermined number of recently shared files 444 that are to be cached is 25, the file system 400 may cache the 25 files that have most recently been shared with the given user (and were not previously cached due to the file being open, pinned or recently accessed). In an example implementation, the file system 400 may cache the most recently shared files 444 in this manner until the predetermined number of recently shared files (e.g., 25 files) has been cached. In other embodiments, as shown in FIG. 4, caching of the recently shared files 444 may be merged with caching of recently accessed files 442. For example, if a predetermined number of 50 files are to be cached, the file system 400 may alternate between most recently modified files, most recently viewed files and/or most recently shared files for a given user until the predetermined number of files (50 files) have been cached. Alternatively, the file system 400 may stop caching files if the threshold amount of storage space available for cached files is reached (or exceeded).

After the caching of the predetermined number of recently shared files 444 is complete, such as just described, the file system 400 may then cache "relevant" files 446. Relevant files 446 may be files that are related to one or more previously cached files (e.g., open files 420, pinned files 430, recently accessed files 442 and/or recently shared files 444). For example, a relevant file 446 may be a file that is in a same directory as a previously cached file. In other implementations, a relevant file 446 may be a file that is of a same file type as a previously cached file. In still other implementations, other criteria may be used to determine one or more relevant files for the previously cached files.

In the file system 400, a number of approaches are possible for caching the relevant files 446. In one implementation, all of the relevant files 446 may be determined for each previously cached file (in a same order as those files were cached) and all the relevant files 446 for a given previously cached file may be cached before caching the relevant files 446 for the next previously cached file. For example, if three files were previously cached, File A first, File B second and File C third, in this implementation, all of the relevant files for File A would be cached before caching any relevant files 446 for File B or File C. Likewise, all the relevant files 446 for File B would be cached before caching any relevant files for File C. Accordingly, the relevant files 446 for File C would be cached last, i.e., after caching the relevant files 446 for File A followed by the relevant files 446 for File B.

In another implementation, the relevant files 446 may be cached by alternating between relevant files 446 for each of the previously cached files, such as by caching one relevant file for each previously cached file in turn. Again using the illustration of previously cached files File A, File B and File C, in this example, one relevant file for File A may be cached, followed by one relevant file for File B, followed by one relevant file for File C, then repeating the sequence. In such an approach, the order in which the relevant files 446 for a given previously cached file are cached (e.g., at each iteration) may be determined using criteria such as a "lastViewedByMeDate" attribute, a "modifiedByMeDate" attribute and/or a "sharedWithMeDate" attribute, such as in similar manners as described above.

When caching the relevant files 446, the process may continue until all relevant files 446 are cached, a number of cached files reaches a number of cached files threshold or a threshold amount of data storage (in the local memory 412) is used by the cached files (open files 420, pinned files 430, recently accessed files 442, recently shared files 444 and relevant files 446). Also, if the relevant files 446 are cached in the alternating fashion described, once all of the relevant files 446 for a given previously cached file are also cached, relevant file caching for the given previously cached file may be skipped for subsequent iterations.

In some embodiments, the set of relevant files 446 may be extremely large (e.g., as compared to available cache storage space in the local memory 412). In other embodiments, the set of relevant files 446 that are truly related to the previously cached files may be difficult (or impossible) to determine because a given user's file directory structure is not well defined (e.g., all of the user's files are stored in a single directory or a small number of directories). In such instances, the file system 400 may be configured to forego caching relevant files.

In other embodiments, the relevant files 446 may be determined in other manners. For instance, the relevant files 446 for a given previously cached file may include files that are included in sub-directories or parent directories (e.g., that are not a root directory) of a directory in which the previously cached file is located. In other implementations, the relevant files 446 may be determined in still other manners. For instance, the relevant files 446 may include files located in directories that are browsed by the user (logged in user). Depending on the particular implementation, a number of other approaches may be used to determine the relevant files 446.

As indicated above, the files that are cached to the local memory 412 may be subject to one or limitations. For instance, the amount of storage space in the local memory 412 that is available for file caching may be limited. In some implementations, the amount of storage space in the local memory 412 that is available for file caching may be defined as a fixed amount of storage space. In other embodiments, the amount of storage space in the local memory 412 that is available for file caching may be defined as a percentage of the total storage space in the local memory 412. In still other embodiments, the number of cached files that may be stored in the local memory 412 may be limited to a threshold number of cached files. Regardless of the criteria use to determine the amount of available space for file caching in the local memory 412, situations will occur where the cache is determined to be "full", indicating no additional files can be cached. In such situations, an eviction process (indicated by the arrow 460 in FIG. 4) may be performed in the file system 400, such as in the manners described below.

In an example implementation, when the file cache included in the local memory 412 is determined to be full, files may be evicted using a priority hierarchy that is substantially the inverse of a priority hierarchy that was used to cache the files that are included in the file cache. The number of files evicted will depend on the particular implementation. For example, files may be evicted until a given amount of storage available for file caching is freed up. In other embodiments, files may be evicted until a certain percentage of the total file cache storage space is freed up. In still other embodiments, files may be evicted until an amount of file cache storage space needed for caching a specific file is freed up. In yet other embodiments, files may be evicted until a number of cached files is below an eviction threshold. A number of other approaches may be used to determine the number of files (amount of data) to evict.

The order in which files are evicted from the cache may be further determined by their respective most recent timestamps. For instance, when a file is first cached, it may be given a timestamp (date/timestamp) indicating when it was cached. In some embodiments, each time a cached file is accessed, its timestamp may be updated to reflect the time of the last access (view and/or modification) of the respective cached file. Accordingly, the eviction process 460 may not evict cached files in the exact reverse order in which they were cached, as the eviction process may be based on the most recent timestamps (timestamp from time cached or timestamp from most recent access).

In an example embodiment, the eviction process 460 may evict files from the file cache in the local memory 412 in the following manner. The relevant files 446 may be evicted first, where the relevant file 446 that has the oldest timestamp is the first to be evicted and the relevant file with the newest timestamp is the last to be evicted. As indicated above, file eviction process 460 may be discontinued once a predetermined amount of file cache storage space is freed up. In this example, once all of the cached relevant files 446 are evicted, the recently shared files 444 may be evicted starting with the oldest timestamp proceeding in reverse order to the recently shared file 444 with the newest timestamp. Again, the file eviction process 460 may be discontinued once a predetermined amount of file cache storage space is freed up. Once all of the cached recently shared files 444 are evicted, the recently accessed files 442 may be evicted starting with the oldest timestamp proceeding in reverse order to the recently accessed file 442 with the newest timestamp. Yet again, the file eviction process 460 may be discontinued once a predetermined amount of file cache storage space is freed up. In other implementations, eviction of the cached recently shared files 444 and the cached recently accessed files 442 may be merged, with those two sets of cached files being evicted as a group based on their timestamps, from the oldest timestamp to newest timestamp. In like fashion as discussed above, once a predetermined amount of file cache storage space is freed up, file eviction may be discontinued. Of course, a number of other approaches may be used for evicting files from a file cache.

In the event that all of the files 440 are evicted from the file cache of the local memory 412 and the amount of needed file cache storage space is still not freed up, a notification may be provided to a user (e.g., a logged in user) requesting that the user unpin files and/or close files in order to allow file caching to proceed. In other implementations, files may be automatically unpinned by the file system 400, such as by using similar criteria to those used for evicting the files 440 from the file cache. For example, files may be automatically unpinned based on their timestamps (oldest to newest).

Figure 5:
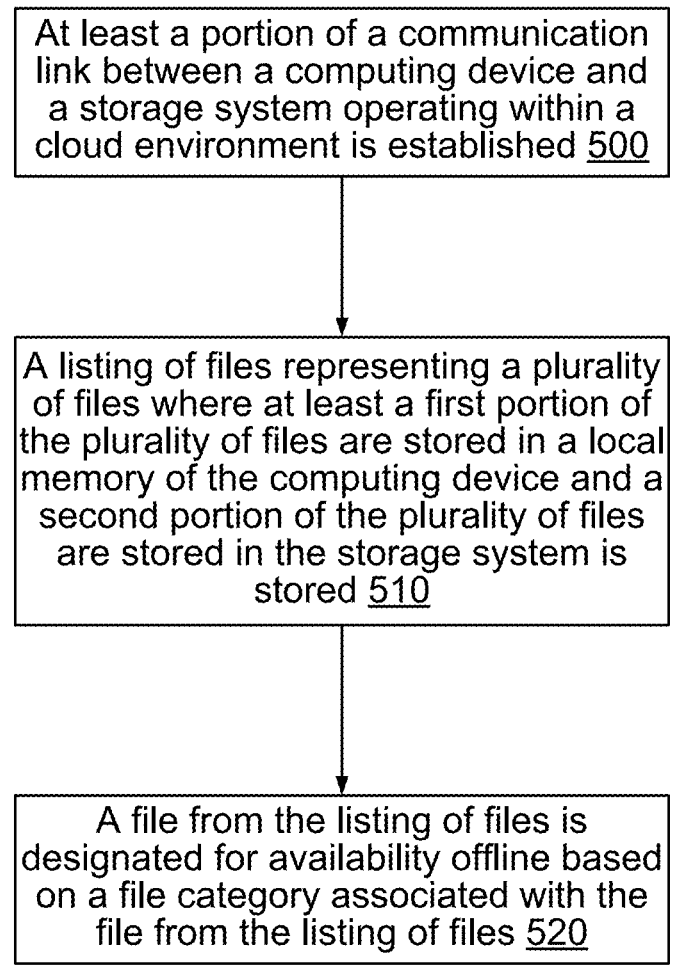
FIG. 5 is a flowchart that illustrates a method related to file handling.

FIG. 5 is a flowchart that illustrates a method related to file handling. As shown in FIG. 5, at least a portion of a communication link between a computing device and a storage system operating within a cloud environment is established (block 500).

As shown in FIG. 5, a listing of files representing a plurality of files where at least a first portion of the plurality of files are stored in a local memory of the computing device and a second portion of the plurality of files are stored in the storage system is stored (block 510). In some embodiments, the listing of files can be stored at and accessed from the cloud environment. In some embodiments, the listing of files can be stored at and access from the computing device.

A file from the listing of files is designated for availability offline based on a file category associated with the file from the listing of files (block 520). In some embodiments, the file can be designated based on a category associated with the file. In some embodiments, the file can be designated based on instructions triggered by a user via the computing device.

In some embodiments, the file can be designated by default or based on a caching state of the file.

Figure 6A:
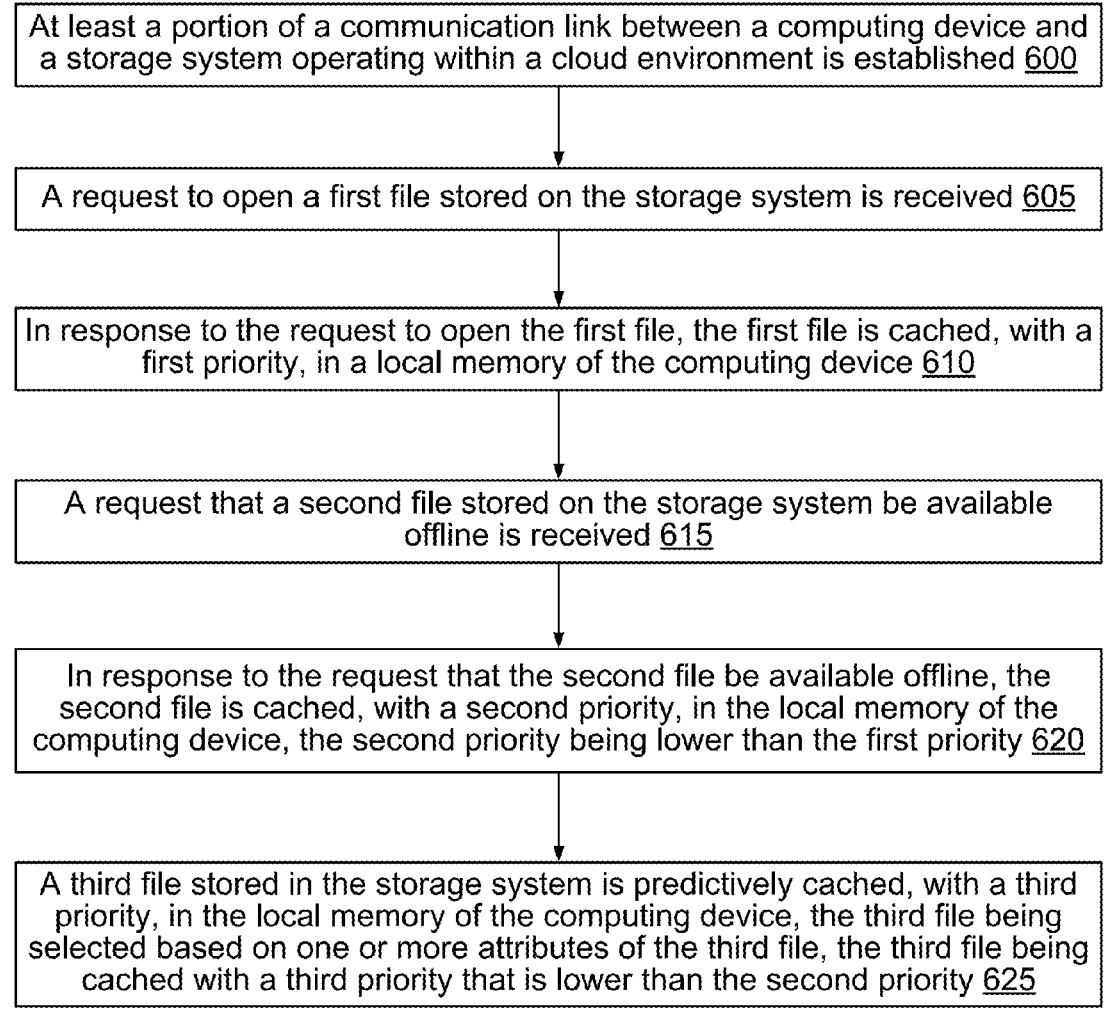
FIGS. 6A-6C are flowcharts that illustrate methods related to file caching.
Figure 6B:
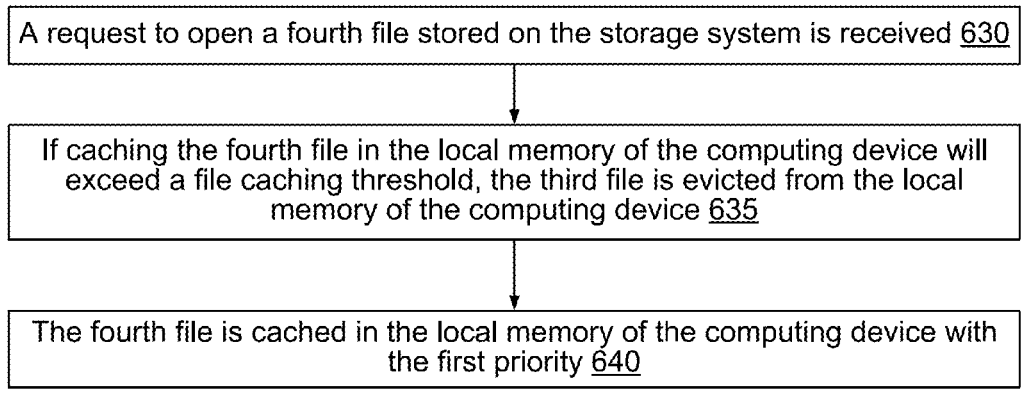
Figure 6C:
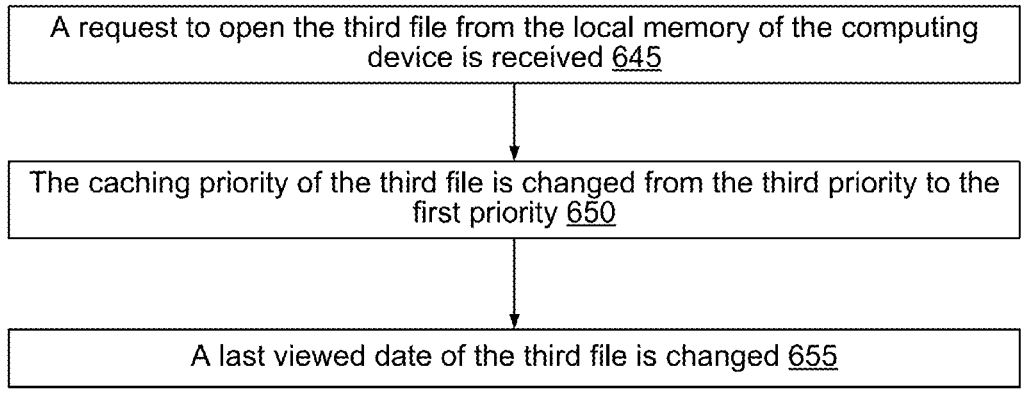

FIGS. 6A-6C are flowcharts that illustrate methods related to file caching. The methods shown in FIGS. 6A-6C may be implemented in conjunction with one another using, for example, the file handling approaches described herein. As shown in FIG. 6A, at least a portion of a communication link between a computing device and a storage system operating within a cloud environment is established (block 600).

As shown in FIG. 6A, a request to open a first file stored on the storage system is received (block 605). In response to the request to open the first file, the first file is cached in a local memory of the computing device, the first file being cached with a first priority (block 610). In some embodiments, the first file can be one of a plurality of files cached with the first priority. The plurality of files (with the first priority) can be cached in the local memory of the computing device in response to respective requests to open each of the plurality of files.

As also shown in FIG. 6A, a request that a second file stored on the storage system be available offline is received (block 615). In response to the request that the second file be available offline, the second file is cached in the local memory of the computing device (block 620), the second file being cached with a second priority that is lower than the first priority. In some embodiments, the second file can be one of a plurality of files cached with the second priority. The plurality of files being cached (with the second priority) in the local memory of the computing device can be cached in response to respective requests that each of the plurality of files be available offline.

As further shown in FIG. 6A, a third file stored in the storage system is predictively cached in the local memory of the computing device (block 625). The third file can be selected based on one or more attributes of the third file, and the third file can be cached with a third priority that is lower than the second priority.

The third file (at block 625) can be one of a plurality of files cached with the third priority. In some embodiments, caching the plurality of files with the third priority can include, caching a first predetermined number of files based on respective last modified dates, caching a second predetermined number of files based on respective last viewed dates, caching a third predetermined number of files based on respective shared dates and/or caching a fourth predetermined number of files based on their relationship, in the storage system, to one or more previously cached files. In other embodiments, caching the plurality of files with the third priority can include caching a predetermined number of files by iterating between caching files based on respective last modified dates and respective last viewed dates of files stored in the storage system.

In certain embodiments, the first file, the second file and the third file (of FIG. 6A) can be cached in the local memory of the computing device based on their respective priorities and based on an amount of available file cache storage capacity in the local memory of the computing device. For instance, the files can be cached, in order of priority (e.g., also using date stamps for files of the same caching priority), until a file caching threshold (e.g., number of files, amount of data and/or so forth) is met or exceeded, such as discussed herein.

As indicated above, the method illustrated in FIG. 6B can be implemented in conjunction with the method of FIG. 6A and, for purposes of illustration, will be described as such. As shown in FIG. 6B, a request to open a fourth file stored on the storage system is received (block 630). In response to receiving the request to the open the fourth file, if caching the fourth file in the local memory of the computing device will exceed a file caching threshold, the third file is evicted (removed) from the local memory of the computing device (block 635). The fourth file is cached in the local memory of the computing device with the first priority (block 640).

As indicated above, the method illustrated in FIG. 6C can (in like fashion as the method illustrated in FIG. 6B) be implemented in conjunction with the method of FIG. 6A and, for purposes of illustration, will be described as such. As shown in FIG. 6C a request to open the third file from the local memory of the computing device is received (block 645). In response to the request of block 645, the caching priority of the third file is changed from the third priority to the first priority (block 650) and a last viewed date of the third file is changed (655).

Figure 7:
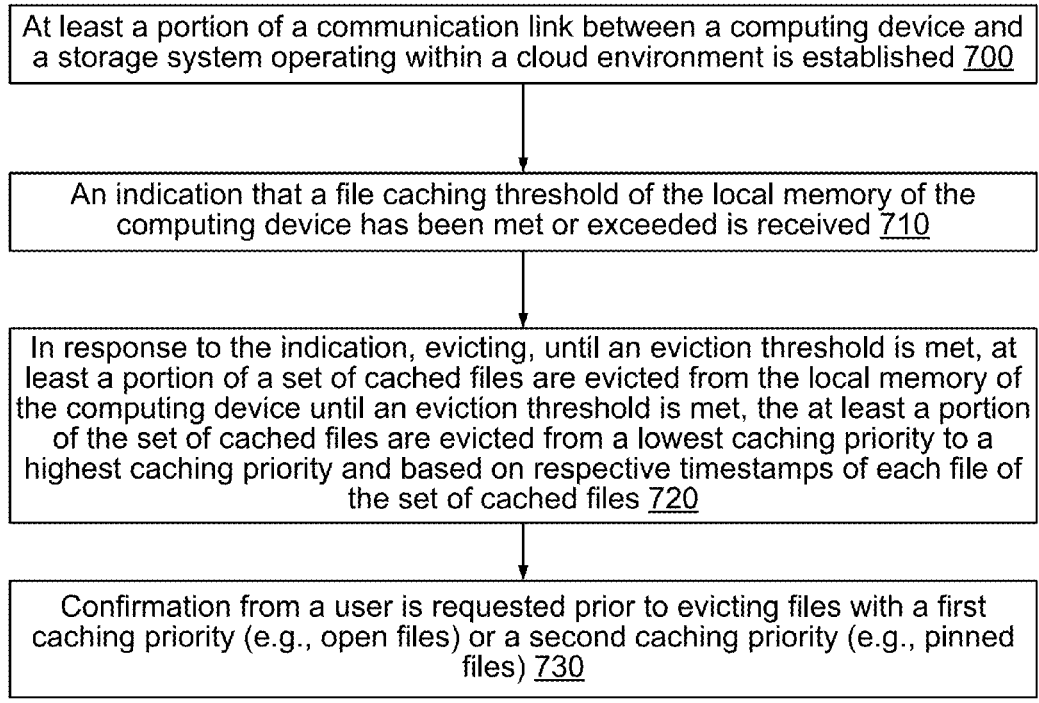
FIG. 7 is a flowchart that illustrates a method related to eviction of cached files.

FIG. 7 is a flowchart illustrating a method related to eviction of cached files. As shown in FIG. 7, at least a portion of a communication link between a computing device and a storage system operating within a cloud environment is established (block 700). The computing device can include a local memory that is configured to cache files from the storage system. An indication that a file caching threshold of the local memory of the computing device has been met or exceeded is received (block 710). In response to the indication at block 710, at least a portion of a set of cached files are evicted from the local memory of the computing device, e.g., until an eviction threshold is met. The at least a portion of the set of cached files can be evicted from a lowest caching priority to a highest caching priority and evicted based on respective timestamps of each file of the set of cached files. As shown in FIG. 7, confirmation from a user is requested prior to evicting files with the first caching priority or the second caching priority. In some embodiments, such confirmation may not be requested before evicting files with a first caching priority (open files) or a second caching priority (pinned files).

In some embodiments, the set of cached files can include a first file with a first caching priority, the first file having been cached in response to a request to open the first file. The set of cached files can also include a second file with a second caching priority, the second file having been cached in response to a request that the second file be available offline, the second priority being lower than the first priority. The set of cached files can further include a third file with a third caching priority, the third file having been cached based on at least one of a last modified date and a last viewed date, the third caching priority being lower than the second caching priority. The set of cached files can still further include a fourth file with a fourth caching priority, the fourth file having been cached based on a date the file was shared, the fourth caching priority being lower than the third caching priority. The set of cached files can also further include a fifth file with a fifth caching priority, the fifth caching priority being lower than the fourth caching priority, the fifth file having been cached based on its relationship in the storage system to at least one of the first file, the second file, the third file and/or the fourth file.

In similar fashion as discussed above with respect to FIG. 6C, a request to access a file of the set of cached files of block 720 can be received, where the file for which access is requested has a caching priority that is lower than the highest caching priority. In response to this request, the caching priority of the file for which access is requested can be changed to the highest caching priority (e.g., a first caching priority).

In a general aspect, a computer-readable storage medium can be configured to store instructions that when executed cause one or more processors to perform a process. The process can include establishing at least a portion of a communication link between a computing device and a storage system operating within a cloud environment. The process can include accessing a user interface including a listing of files representing a plurality of files where at least a first portion of the plurality of files are stored in a local memory of the computing device and a second portion of the plurality of files are stored in the storage system.

In another general aspect, a computer-readable storage medium can be configured to store instructions that when executed cause one or more processors to perform a process. The process can include establishing at least a portion of a communication link between a computing device and a storage system operating within a cloud environment. The process can include storing a listing of files representing a plurality of files where at least a first portion of the plurality of files are stored in a local memory of the computing device and a second portion of the plurality of files are stored in the storage system, and can include designating at least a portion of the list of files for availability offline in response to at least one of an instruction received from the computing device or based on a file category associated with the portion of the listing of files.

In yet another general aspect, an apparatus can include a storage system configured to operate within a cloud environment and configured to store a plurality of files. At least a first portion of the plurality of files is stored in the storage system, and a second portion of the plurality of files are synchronized in a local memory of a computing device. In some implementations, the storage system includes a file manager configured to provide, to the computing device, a user interface including a listing representing the plurality of files.

In yet another general aspect, a computer-readable storage medium can be configured to store instructions that when executed cause one or more processors to perform a process. The process can include establishing at least a portion of a communication link between a first computing device and a storage system operating within a cloud environment. The process can include storing a plurality of files and sending from the storage system to the first computing device, in response to a download request from the first computing device, a portion of the plurality of files for caching at the first computing device. Sending, to a second computing device, a user interface including a listing of files representing the plurality of files and including the portion of the plurality of files cached at the first computing device.

Implementations of the various techniques described herein may be implemented in digital electronic circuitry, or in computer hardware, firmware, software, or in combinations of them. Implementations may implemented as a computer program product, i.e., a computer program tangibly embodied in an information carrier, e.g., in a machine-readable storage device (computer-readable medium), for processing by, or to control the operation of, data processing apparatus, e.g., a programmable processor, a computer, or multiple computers. Thus, a computer-readable storage medium can be configured to store instructions that when executed cause a processor (e.g., a processor at a host device, a processor at a computing device) to perform a process. A computer program, such as the computer program (s) described above, can be written in any form of programming language, including compiled or interpreted languages, and can be deployed in any form, including as a stand-alone program or as a module, component, subroutine, or other unit suitable for use in a computing environment. A computer program can be deployed to be processed on one computer or on multiple computers at one site or distributed across multiple sites and interconnected by a communication network.

Method steps may be performed by one or more programmable processors executing a computer program to perform functions by operating on input data and generating output. Method steps also may be performed by, and an apparatus may be implemented as, special purpose logic circuitry, e.g., an FPGA (field programmable gate array) or an ASIC (application-specific integrated circuit).

Processors suitable for the processing of a computer program include, by way of example, both general and special purpose microprocessors, and any one or more processors of any kind of digital computer. Generally, a processor will receive instructions and data from a read-only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Information carriers suitable for embodying computer program instructions and data include all forms of non-volatile memory, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), a light emitting diode (LED), or liquid crystal display (LCD) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Implementations may be implemented in a computing system that includes a back-end component, e.g., as a data server, or that includes a middleware component, e.g., an application server, or that includes a front-end component, e.g., a client computer having a graphical user interface or a Web browser through which a user can interact with an implementation, or any combination of such back-end, middleware, or front-end components. Components may be interconnected by any form or medium of digital data communication, e.g., a communication network. Examples of communication networks include a local area network (LAN) and a wide area network (WAN), e.g., the Internet.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or."

While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the implementations. It should be understood that they have been presented by way of example only, not limitation, and various changes in form and details may be made. Any portion of the apparatus and/or methods described herein may be combined in any combination, except mutually exclusive combinations. The implementations described herein can include various combinations and/or sub-combinations of the functions, components and/or features of the different implementations described.

What is claimed is:

1. A non-transitory computer-readable storage medium configured to store instructions that when executed cause one or more processors to perform a process, the process comprising:
  establishing at least a portion of a communication link between a computing device and a storage system operating within a cloud environment;
  receiving a request to open a first file stored on the storage system;
  in response to the request to open the first file, caching the first file in a local memory of the computing device, the first file being cached with a timestamp and a first priority based on an attribute of the first file being a request to open the first file, and the timestamp used for determining an eviction order from the local memory of the first file with respect to other files cached with a first priority;
  receiving a request that a second file stored on the storage system be available offline;
  in response to the request that the second file be available offline, caching the second file in the local memory of the computing device, the second file being cached with a timestamp and a second priority based on an attribute of the second file being a request that the second file be available offline, the second priority being lower than the first priority and identifying the second file for eviction from the local memory before the first file, and the timestamp used for determining an eviction order from the local memory of the second file with respect to other files cached with a second priority;
  associating a file attribute with a third file stored on the storage system, the file attribute being at least one of a last modified date and a last viewed date associated with the third file;
  subsequent to caching the first file and the second file, selecting the third file for caching in the local memory of the computing device based on the file attribute associated with the third file; and
  caching the third file in the local memory of the computing device with a timestamp and a third priority that is lower than the second priority, the third priority identifying the third file for eviction from the local memory before the second file, and the timestamp used for determining an eviction order from the local memory of the third file with respect to other files cached with a third priority.

2. The non-transitory computer-readable storage medium of claim 1, wherein the first file, the second file and the third file are cached in the local memory of the computing device based on their respective priorities and based on an amount of available file cache storage capacity in the local memory of the computing device.

3. The non-transitory computer-readable storage medium of claim 1, the process further comprising:
  receiving a request to open a fourth file stored on the storage system; and
  in response to receiving the request to the open the fourth file:
    if caching the fourth file in the local memory of the computing device will exceed a file caching threshold, evicting the third file from the local memory of the computing device; and
    caching the fourth file in the local memory of the computing device with the first priority.

4. The non-transitory computer-readable storage medium of claim 1, wherein the first file is one of a plurality of first files cached with the first priority, the plurality of files being cached in the local memory of the computing device in response to respective requests to open each of the plurality of files, each of the plurality of first files being cached with a timestamp and a first priority based on an attribute of the first file being a request to open the first file, the timestamp being used for determining an eviction order from the local memory of a particular first file included in the plurality of first files with respect to each of the plurality of first files.

5. The non-transitory computer-readable storage medium of claim 1, wherein the second file is one of a plurality of second files cached with the second priority, the plurality of files being cached in the local memory of the computing device in response to respective requests that each of the plurality of files be available offline, each of the plurality of second files being cached with a timestamp and a second priority based on an attribute of the second file being a request that the second file be available offline, the timestamp being used for determining an eviction order from the local memory of a particular second file included in the plurality of second files with respect to each of the plurality of second files.

6. The non-transitory computer-readable storage medium of claim 1, further comprising:
  associating a file attribute with a fourth file stored on the storage system, the file attribute being based on a relationship of the fourth file to one or more previously cached files on the computing device; and
  subsequent to caching the first file, the second file, and the third file, selecting the fourth file for caching in the local memory of the computing device based on the file attribute associated with the fourth file.

7. The non-transitory computer-readable storage medium of claim 1, the process further comprising:
  receiving a request to open the third file from the local memory of the computing device;
  changing the third file from the third priority to the first priority; and
  changing a last viewed date of the third file.

8. A non-transitory computer-readable storage medium configured to store instructions that when executed cause one or more processors to perform a process, the process comprising:
  establishing at least a portion of a communication link between a computing device and a storage system operating within a cloud environment, the computing device including a local memory that is configured to cache files from the storage system; and associating a caching priority and a timestamp with each file included in a set of cached files stored in the local memory, the associating including:
  associating a first file with a first caching priority based on an attribute of the first file being a request to open the first file;
  associating a second file with a second caching priority based on an attribute of the second file being a request that the second file be available offline, the second caching priority being lower than the first caching priority;
receiving an indication that a file caching threshold of the local memory of the computing device has been met or exceeded; and
in response to the indication,
  identifying a first subset of the set of cached files, each file included in the first subset of the set of cached files being associated with the first caching priority;
  identifying a second subset of the set of cached files, each file included in the second subset of the set of cached files associated with the second caching priority, files associated with the second caching priority being identified for eviction from the local memory before files associated with the first caching priority; and
  evicting, until an eviction threshold is met, at least a portion of the set of cached files from the local memory, the evicting including:
    evicting the files included in the second subset of files in an order based on the timestamp associated with each file; and
    subsequent to evicting the files included in the second subset of files, evicting the files included in the first subset of files in an order based on the timestamp associated with each file.

9. The non-transitory computer-readable storage medium of claim 8,
  wherein associating a caching priority and a timestamp with each file included in the set of cached files stored in the local memory further includes:
    associating a third file with a third caching priority based on an attribute of the third file being at least one of a last modified date and a last viewed date associated with the third file, the third caching priority being lower than the second caching priority;
    associating a fourth file with a fourth caching priority based on an attribute of the fourth file being a date that the fourth file was shared, the fourth caching priority being lower than the third caching priority; and
    associating a fifth file with a fifth caching priority based on an attribute of the fifth file being a relationship in the storage system of the fifth file to at least one of the first file, the second file, the third file and the fourth file, the fifth caching priority being lower than the fourth caching priority.

10. The non-transitory computer-readable storage medium of claim 8, the evicting further including:
  requesting confirmation from a user prior to evicting each of the identified files from the first subset of files or the second subset of files.

11. The non-transitory computer-readable storage medium of claim 8, the process further comprising:
  receiving a request to access a particular file of the set of cached files, the particular file for which access is requested being associated with the second caching priority; and
  in response to the request, changing the caching priority associated with the particular file for which access is requested to the first caching priority.

12. The non-transitory computer-readable storage medium of claim 8, wherein the storage system operates as a primary storage system for the computing device.

13. The non-transitory computer-readable storage medium of claim 8, wherein associating a caching priority and a timestamp with each file included in a set of cached files stored in the local memory further includes:
  associating a third file with the second caching priority based on an attribute of the third file being the most recently accessed file stored in the local memory of the computing device.

14. The non-transitory computer-readable storage medium of claim 8, wherein associating a caching priority and a timestamp with each file included in a set of cached files stored in the local memory further includes:
  associating a third file with the second caching priority based on an attribute of the third file being an instruction received from the computing device.

15. A computer-implemented method comprising:
  establishing, by a computing device, at least a portion of a communication link between the computing device and a storage system operating within a cloud environment, the computing device including a local memory that is configured to cache files from the storage system;
  associating, by the computing device, a caching priority and a timestamp with each file included in a set of cached files stored in the local memory, the associating including:
    associating a first file with a first caching priority based on an attribute of the first file being a request to open the first file;
    associating a second file with a second caching priority based on an attribute of the second file being a request that the second file be available offline, the second caching priority being lower than the first caching priority;
  receiving an indication that a file caching threshold of the local memory of the computing device has been met or exceeded; and
  in response to the indication,
    identifying a first subset of the set of cached files, each file included in the first subset of the set of cached files being associated with the first caching priority;
    identifying a second subset of the set of cached files, each file included in the second subset of the set of cached files associated with the second caching priority, files associated with the second caching priority being identified for eviction from the local memory before files associated with the first caching priority; and
    evicting, until an eviction threshold is met, at least a portion of the set of cached files from the local memory, the evicting including:
      evicting the files included in the second subset of files in an order based on the timestamp associated with each file; and
      subsequent to evicting the files included in the second subset of files, evicting the files included in the first subset of files in an order based on the timestamp associated with each file.

16. The computer-implemented method of claim 15, wherein associating a caching priority and a timestamp with each file included in the set of cached files stored in the local memory further includes:

associating a third file with a third caching priority based on an attribute of the third file being at least one of a last modified date and a last viewed date associated with the third file, the third caching priority being lower than the second caching priority;

associating a fourth file with a fourth caching priority based on an attribute of the fourth file being a date that the fourth file was shared, the fourth caching priority being lower than the third caching priority; and associating a fifth file with a fifth caching priority based on an attribute of the fifth file being a relationship in the storage system of the fifth file to at least one of the first file, the second file, the third file and the fourth file, the fifth caching priority being lower than the fourth caching priority.

17. The computer-implemented method of claim 15, the evicting further including:

requesting confirmation from a user prior to evicting each of the identified files from the first subset of files or the second subset of files.

18. The computer-implemented method of claim 15, further comprising:

receiving a request to access a particular file of the set of cached files, the particular file for which access is requested being associated with the second caching priority; and in response to the request, changing the caching priority associated with the particular file for which access is requested to the first caching priority.

19. The computer-implemented method of claim 15, wherein the storage system operates as a primary storage system for the computing device.

20. The computer-implemented method of claim 15, wherein associating a caching priority and a timestamp with each file included in a set of cached files stored in the local memory further includes:

associating a third file with the second caching priority based on an attribute of the third file being the most recently accessed file stored in the local memory of the computing device.

21. The computer-implemented method of claim 15, wherein associating a caching priority and a timestamp with each file included in a set of cached files stored in the local memory further includes:

associating a third file with the second caching priority based on an attribute of the third file being an instruction received from the computing device.

\* \* \* \* \*

UNITED STATES PATENT AND TRADEMARK OFFICE
CERTIFICATE OF CORRECTION

PATENT NO. : 9,594,686 B2
APPLICATION NO. : 13/841368
DATED : March 14, 2017
INVENTOR(S) : Woodward et al.

Page 1 of 1

It is certified that error appears in the above-identified patent and that said Letters Patent is hereby corrected as shown below:

In the Claims

In Column 22, Line 9, Claim 3, delete "to the open" and insert -- to open --, therefor.

Signed and Sealed this
Twentieth Day of June, 2017

Joseph Matal
*Performing the Functions and Duties of the*
*Under Secretary of Commerce for Intellectual Property and*
*Director of the United States Patent and Trademark Office*